United States Patent [19]

Blackwell

[11] Patent Number: 4,506,715
[45] Date of Patent: Mar. 26, 1985

[54] ADZING BIT ASSEMBLY

[76] Inventor: George T. Blackwell, P.O. Box 278, Oneonta, Ala. 35121

[21] Appl. No.: 493,606

[22] Filed: May 11, 1983

[51] Int. Cl.³ ............................................. B22G 13/00
[52] U.S. Cl. .................................. 144/241; 144/218; 144/133 R; 76/101 A; 407/48
[58] Field of Search ........... 144/133 R, 133 A, 134 R, 144/136 R, 218, 241; 407/7, 40, 48; 76/101 A, 101 R, 82

[56] References Cited

U.S. PATENT DOCUMENTS

| | | | |
|---|---|---|---|
| 1,859,978 | 5/1932 | Metzger | 76/101 A |
| 2,422,404 | 6/1947 | Goehle | 76/101 A |
| 3,005,479 | 10/1969 | Blackwell, Jr. | 144/134 |
| 3,486,542 | 12/1969 | Blackwell | 144/133 R |

FOREIGN PATENT DOCUMENTS 1125043 10/1956 France ................................. 407/48

Primary Examiner—W. D. Bray
Assistant Examiner—Jorji M. Griffin
Attorney, Agent, or Firm—Thomas & Kennedy

[57] ABSTRACT

The adzing bit assembly includes a circular cutting bit with a circular edge formed by the merging of its flat face and its peripheral surface at an acute angle. A cutting bit shield abuts and covers the face of the cutting bit and extends to a diameter substantially equal to the diameter of the cutting edge, so as to shield the face and the cutting edge of the cutting bit. The cutting bit is fabricated from harder material than the cutting bit shield, so that the cutting bit shield wears away during use and the circular cutting edge of the cutting bit is progressively exposed.

12 Claims, 6 Drawing Figures

ADZING BIT ASSEMBLY

BACKGROUND OF THE INVENTION

This invention relates in general to adzing apparatus of the type utilized to cut railroad crossties, wherein one or more adzing heads are rotated about a vertical axis and are moved along a railroad track and progressively cut the upper surfaces of the railroad crossties for the placement of rails along the crossties. Each adzing head includes a plurality of cutting bit assemblies which are rotated by the adzing head in an orbit about the vertical axis. The cutting bit assemblies each include an annular cutting bit made of hardened metal or other hardened material which engages and cuts into the crossties. More particularly, the invention relates to an adzing bit assembly for mounting to an adzing apparatus which includes an annular cutting bit that has an annular cutting edge that is protected by a disk-shaped cutting bit shield and which is made of softer material than the cutting bit, and which wears away during use of the adzing head so as to progressively expose the cutting edge of the bit.

In the maintenance of railroads, it is customary to prepare the crossties of a rail bed by cutting the crossties to form grooves or seats in the ties for the reception of rail chairs which support the rails. Because of the particular configuration of the seats that must be formed in the crossties, special cutting tools have been utilized that are capable of rapidly cutting the ties with seats of the proper dimension. U.S. Pat. Nos. 3,005,479 and 3,486,542 disclose prior art adzing devices that have been developed for this purpose.

The cutting bits of the adzing heads used to cut rail seats in crossties usually are disk-shaped with a central opening through which a bolt or other connector extends. The cutting bit is made of hardened material, and usually is supported on its opposite parallel surfaces by various washers, bolt heads, and bushings. In order that the cutting bits last for a long time, it is desirable that they be fabricated of very hard material; however, the very hard materials are brittle and are subject to becoming chipped or cracked during use.

SUMMARY OF THE INVENTION

Briefly described, the present invention comprises an adzing bit assembly of the type utilized with an adzing head to cut railroad crossties, whereby several of the adzing bit assemblies are mounted on an adzing head and as the adzing head is rotated about a vertical axis the adzing bit assemblies are rotated in an orbit about the vertical axis and cuts downwardly into the crosstie material. The adzing bit assembly includes a disk-shaped cutting bit that defines a central opening, and a disk-shaped cutting bit shield which also defines a central opening. The cutting bit shield is of the same breadth as the cutting bit and substantially covers the entire face of the cutting bit and extends radially outwardly to be coextensive at its edge with the cutting dge of the cutting bit. The cutting bit is made of hardened material, such as carbide steel, and the cutting bit shield is made of material that is not as hard as the cutting bit, such as steel. The cutting bit shield is tapered at its outer annular edge, and is therefore not as thick at its outer perimeter as it is adjacent its central portion, and during use of the assembly its outer peripheral portion progressively wears away so as to progressively expose the cutting edge of the cutting bit.

With this arrangement, the cutting bit shield protects the flat face of the cutting bit from impact with hard objects, thereby reducing the likelihood of the cutting bit becoming chipped or cracked during use.

Thus, it is an object of this invention to provide an adzing bit assembly for use with railroad crosstie adzing apparatus whereby the cutting bit is shielded to a substantial extent from contact with hard objects, and the cutting edge of the cutting bit is progressively exposed during use.

Another object of this invention is to provide an adzing bit assembly which is more durable during use than the known prior art, and which is inexpensive to construct and to assemble to the adzing head, and which is convenient to replace.

Other objects, features and advantages of the present invention will become apparent upon reading the following specification, when taken in conjunction with the accompanying drawings.

DETAILED DESCRIPTION

Figure 1:
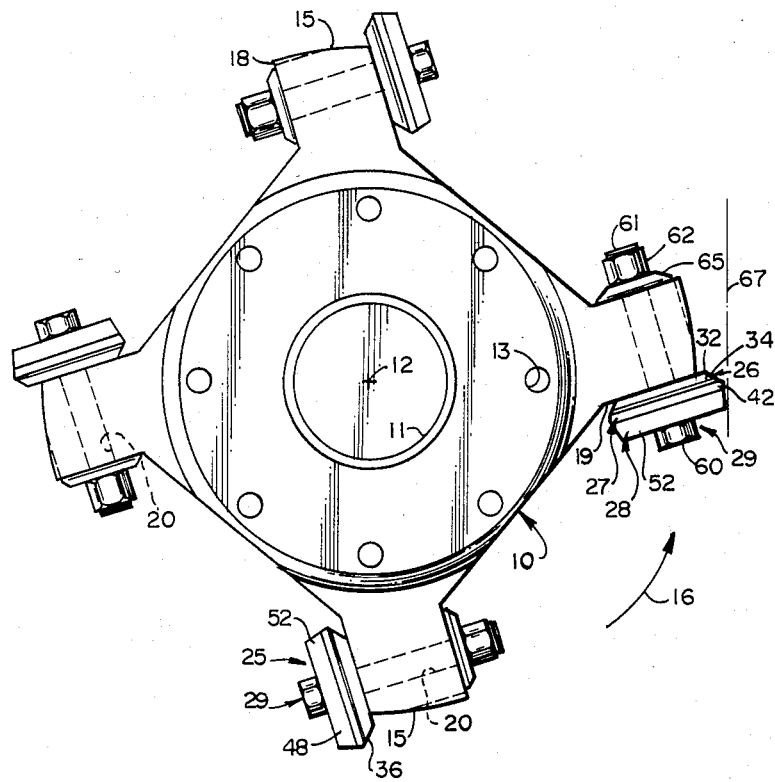
FIG. 1 is a plan view of an adzing cutter head with the adzing bit assembly mounted thereon.
Figure 2:
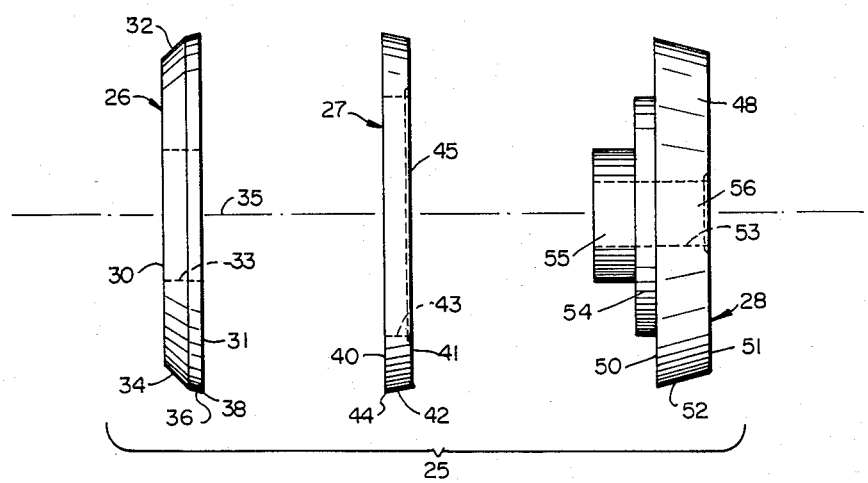
FIG. 2 is an expanded side view of the cutting bit shield, the cutting bit, and the protective support cap, which, together with the connector bolt, make up the adzing bit assembly.
Figure 4:
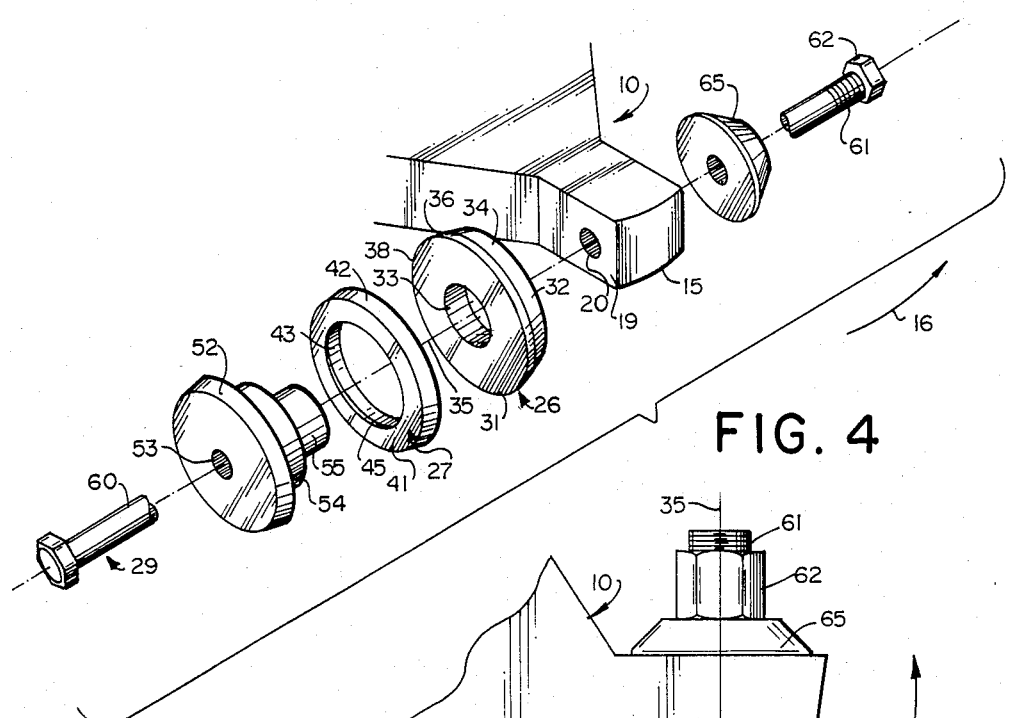
FIG. 4 is a perspective expanded illustration of an adzing bit assembly according to the present invention.

Referring now in more detail to the drawings, in which like numerals indicate like parts throughout the several views, FIG. 1 illustrates an adzing head 10 of conventional design, which includes a central opening 11 that is coaxial with the center 12 of the adzing head, and a circular array of smaller openings 13 which are circumferentially spaced about the adzing head and are equally spaced from the center 12 of the adzing head. The central opening 11 is shaped to fit over a hub of a fly wheel or other rotary drive means, (not shown) while the openings 13 are adapted to be aligned with similar openings of the flywheel and to receive connecting screws extending therethrough. The adzing head is to be rotated about a vertical axis which is coaxial with the center 12 of the adzing head. A plurality of cutter support projections 15 extend radially outwardly from the central portion of the adzing head, with the projections 14 being equally spaced circumferentially. The adzing head is to be rotated in the direction indicated by arrow 16, and the cutter support projections 15 are angled in the direction of rotation, and provide opposed parallel mounting surfaces 18 and 19, with the leading surface 18 of each projection formed in a plane that extends through the center 12 of the adzing head. A cylindrical bore 20 is formed through each cutter support projection 15, is oriented in a plane perpendicular to the axis of rotation of the adzing head 10 and perpendicular to the opposed parallel mounting surface 18 and 19. This is generally known in the prior art.

The adzing bit assembly 25 comprises cutting bit shield 26, cutting bit 27, support cap or bushing 28 and connector bolt 29. Cutting bit shield 26 is approximately disk-shaped and includes opposed parallel first and second support or bearing surfaces 30 and 31, peripheral surface 32 and central cylindrical opening 33. The outside diameter of the first bearing surface 30 is smaller than the outside diameter of the second bearing surface 31. The annular peripheral surface 32 is sloped conically, radially outwardly from the first bearing surface 30 toward the second bearing surface 31, with a first sloped surface 34 that extends at an angle of approximately 45° with respect to the longitudinal axis 35 of the cutting bit. The second sloped surface 36 extends at an angle of approximately 15° with respect to the longitudinal axis 35 and extends from the first sloped surface to the second bearing surface 31. The second sloped surface 36 forms with the second bearing surface 31 a protective edge 38.

Cutting bit 27 is also approximately disk-shaped and includes opposed parallel first and second support or bearing surfaces 40 and 41, peripheral surface 42, and central cylindrical opening 43. The peripheral surface 42 is sloped from the first bearing surface toward the second bearing surface 41 at an angle of approximately 12°, thereby forming a conically sloped annular surface, with the peripheral surface 42 disposed at an acute angle with respect to the first bearing surface 40 and forming a circular cutting edge 44. A camfer 45 is formed at the intersection between the central cylindrical opening 43 and the second bearing surface 41.

Support cap or bushing 28 includes an approximately disk-shaped main body or cap 48 with opposed parallel first and second surfaces 50 and 51, peripheral surface 52 and central cylindrical opening 53. A first large diameter hub 54 protrudes from first surface 50 of cap 48, and second smaller diameter hub 55 protrudes from large diameter hub 54, with the hubs 54 and 55 being coaxial with respect to the cap. The cylindrical opening 53 extends coaxially through both cap 48 and its hubs 54 and 55. A camfer 56 is formed at the intersection of the central opening 53 and the second surface 51 of cap 48. The peripheral surface 52 of cap 48 is sloped inwardly at an angle of approximately 15° from the first surface 50 toward the second surface 51. The outside diameter of the first surface 50 of cap 48 is approximately equal ot the outside diameter of the second surface 41 of cutting bit 27.

Connector bolt 59 includes cap screw 60 with a threaded shank 61, and internally threaded nut 62.

The outside diameter of first large diameter hub 54 is approximately equal to the diameter of central cylindrical opening 43 of cutting bit 27, and the thickness of the hub 54 is approximately equal to the thickness of cutting bit 27. The outside diameter of smaller diameter hub 25 of support cap 28 is approximately equal to the diameter of the central cylindrical opening 33 of cutting bit shield 26, and the thickness of the hub 55 is approximately equal to the thickness of the cutting bit.

When the adzing bit assembly 25 is assembled, the support cap 28 is extended about the shank of cap screw 60 with its smaller diameter second surface 51 in abutment with the cap of the screw. The cutting bit 27 is also extended about the shank of the cap screw, with its opening 27 fitted about the larger diameter hub 54, so that its second surface 41 faces the first surface 50 of the support cap. The facing surfaces of the cutting bit 27 and of the support cap 28 will be silver soldered together, so as to make a unitary structure.

Figure 3:
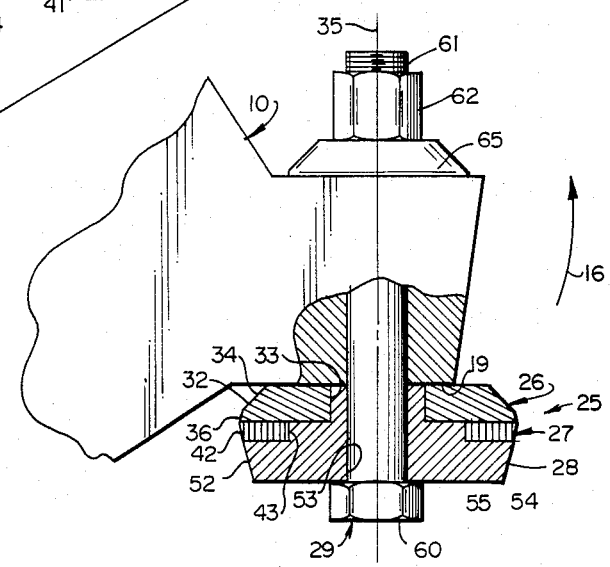
FIG. 3 is a plan view, with parts broken away and partially in cross section, of a support of the adzing head of FIG. 1, with an adzing bit assembly mounted to the support.

Likewise, cutting bit shield 26 is positioned about the shank of the cap screw and its central cylindrical opening 33 is fitted about the smaller diameter hub 54 so that its second bearing surface 31 is in facing relationship with respect to the first bearing surface 40 of the cutting bit. The cylindrical opening 33 is press-fit about the smaller diameter hub 54 of the support cap 28. The protruding end portion of the shank of the connector bolt 59 is then inserted through the bore 20 of a cutter support projection 15 of an adzing head 10 (FIGS. 1 and 3), and the nut 62 is threaded onto the protruding threaded end portion of the nut. A washer 65 is positioned between the nut 62 and the mounting surface 18 of the support projection of the adzing head 10.

The angle at which adzing bit assembly 25 is carried by the adzing head 10 and the slopes of the conical, peripheral surfaces 42 and 52 of the cutting bit 27 and support cap 28 are arranged so that should the adzing head be inadvertently moved toward engagement with an upright surface 67 (FIG. 1), the cutting bit 27 is not likely to engage the upright surface 67 since the peripheral surface 52 of the support cap 28 moves through a larger diameter path about the axis of rotation 12 of the adzing head 10.

Figure 5B:
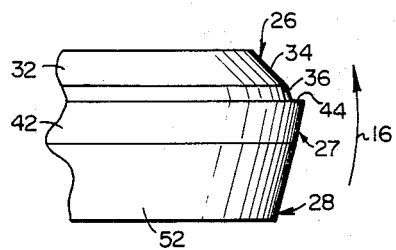
FIGS. 5A and 5B are detail illustrations of an adzing bit assembly, showing in FIG. 5A the cutting bit shield before it has become worn, and showing in FIG. 5B the cutting bit shield after it has been partially worn away to expose the cutting edge of the bit.
Figure 5A:
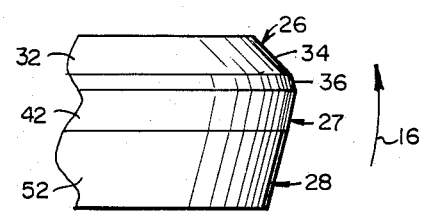

As illustrated in FIGS. 5A and 5B, the adzing head 10 moves the adzing bit assembly 25 in the direction as indicated by arrow 16. Since the second surface 31 of the cutting bit shield 26 is of approximately the same diameter as the facing first surface 40 of the cutting bit 27, the circular cutting edge 44 of the cutting bit is substantially shielded from contact with the crosstie material and other objects as the adzing head is rotated.

The cutting bit shield 26 is made of softer material than the cutting bit. Typically, the cutting bit 27 is fabricated of carbide steel while the cutting bit shield 26 is fabricated of a softer steel. As the adzing head is rotated and the adzing bit assembly engages the material to be cut, the softer cutting bit shield 26 begins to wear away as indicated in FIG. 5B, which progressively exposes the cutting edge 44 of the cutting bit. In the meantime, the cutting bit shield 26 protects the rest of the cutting bit from engagement with hard objects, thereby reducing the likelihood of cracking or chipping of the cutting bit.

When the adzing bit assembly 25 is mounted to the cutter support projection 15 of the adzing head 10, the nut 62 will be tightened securely to the screw 60, thereby drawing the cutting bit shield 26, cutting bit 27 and support cap 28 into a stationary position against the mounting surface 19 of the cutter support projection 15. When substantial wear is detected on the cutting bit 27, the nut 62 can be loosened and the adzing bit assembly rotated, about 30°, and the nut retightened. This presents a new cutting surface of the cutting bit for use in the cutting operation. Since the cutting bit shield 26, cutting bit 27 and support cap 28 are all rigidly connected together by the silver solder applied thereto, there will be no rotation between these parts, so that when a portion of the cutting bit shield 26 has been worn away, there is no hazard that that worn portion will be rotated with respect to the cutting bit 27 to overexpose another portion of the cutting edge of the cutting bit.

The silver solder applied between the facing surfaces of the support cap 28 and the cutting bit 27 functions to cushion these parts with respect to one another, so that the extreme vibrations usually encountered by a typical adzing bit assembly will be dampened somewhat, thereby further protecting the cutting bit 27.

While this invention has been described in detail with particular reference to a preferred embodiment thereof, it will be understood that variations and modifications can be effected within the spirit and scope of the invention as described hereinbefore and as defined in the appended claims.

What is claimed is:

1. In an adzing apparatus of the type utilized to cut railroad crossties including a cutter head rotatable in one direction about an approximately upright axis of rotation with a plurality of support projections extending radially outwardly from the axis of rotation, each support projection defining a through bore disposed in a plane approximately perpendicular to the axis of rotation, the improvement comprising an adzing bit assembly including:
   a fastening bolt including a screw element for extending through the through bore of the cutter head and including an enlarged head at one of its ends and thread means at the other of its ends, and a nut member for engagement with the thread means of said screw,
   an approximately disk-shaped cutting bit shield defining a central cylindrical opening surrounding said fastening bolt and including parallel oppositely facing first and second bearing surfaces, with said first bearing surface being of smaller diameter than said second bearing surface and for positioning with its first bearing surface facing the direction of rotation of the cutter head,
   an approximately disk-shaped cutting bit defining a central cylindrical opening surrounding said fastening bolt and including parallel oppositely facing first and second bearing surfaces, with said first bearing surface being of larger diameter than said second bearing surface and of approximately equal diameter as the second bearing surface of said cutting bit shield and facing the second bearing surface of said cutting bit shield, and
   a support cap defining a central cylindrical opening surrounding said fastening bolt and including a flat bearing surface positioned adjacent the second bearing surface of said cutting bit and including an outer periphery which is substantially equal in size and shape to the outer periphery of the second bearing surface of said cutting disk.

2. The improvement of claim 1 and wherein said support cap includes a first hub of an external diameter which corresponds to the diameter of the central opening of said cutting bit and extends from the flat bearing surface of the support cap about the central opening of said support cap through the central opening of said cutting bit, and a second hub of an external diameter which corresponds to the diameter of the central opening of said cutting bit shield and extending from said first hub about the central opening of said support cap through the central opening of cutting bit.

3. The improvement of claim 1 and wherein said cutting bit is soldered to said support cap and to said cutting bit shield.

4. The improvement of claim 1 and wherein said cutting bit shield is fabricated of steel, and wherein said cutting bit is fabricated of carbide steel.

5. The improvement of claim 1 and wherein said cutting bit includes an external conical surface which is sloped from its second bearing surface outwardly toward its first bearing surface, and wherein said cutting bit shield includes an external conical surface which is sloped from its first bearing surface outwardly toward its second bearing surface.

6. The improvement of claim 5 and wherein said cutting bit is fabricated from a material that is harder than the cutting bit shield, whereby the cutting bit shield wears away when in use to expose the cutting bit.

7. An adzing bit assembly for use with an adzing apparatus to cut railroad crossties and the like comprising
   a substantially disk-shaped cutting bit including parallel first and second bearing surfaces with the first bearing surface of said cutting bit being of larger diameter than its second bearing surface, and a conical peripheral surface disposed at an acute angle with respect to said first bearing surface and forming with said first bearing surface a circular cutting edge,
   a substantially disk-shaped cutting bit shield including parallel first and second bearing surfaces with the second bearing surface of said cutting bit shield being of larger diameter than its first bearing surface, and a conical peripheral surface disposed at an acute angle with respect to said second bearing surface, and forming with the second bearing surface a circular wear edge, the second bearing surface of said cutting bit shield being of a diameter substantially equal to the diameter of the first bearing surface of said cutting bit so that the cutting edge of said cutting bit and the wear edge of the cutting bit shield are substantially equal in diameter,
   connector means for holding said cutting bit and said cutting bit shield in coaxial relationship with the second bearing surface of said cutting bit shield facing the first bearing surface of said cutting bit,
   said cutting bit being fabricated of harder material than said cutting bit shield,
   whereby when the adzing bit assembly is mounted on an adzing apparatus with the cutting edge facing in the direction of movement and used to cut railroad crossties or the like, the wear edge of the cutting bit shield wears away to expose the cutting edge of the cutting bit.

8. The adzing bit assembly of claim 7 and further including a support cap including a bearing surface sized and shaped to abut the second bearing surface of said cutting bit, and wherein said cutting bit, cutting bit shield and said support cap each define central openings, and wherein said connector means extends through said central openings.

9. The adzing bit assembly of claim 7 and wherein the peripheral surface of said cutting bit shield is formed in two annular conical surfaces with the first conical surface disposed at a greater angle than the other conical surface with respect to the longitudinal axis of said cutting bit shield.

10. The adzing bit assembly of claim 7 and further including a support cap positioned adjacent the second bearing surface of said cutting bit, with said support cap and said cutting bit being soldered together at their adjacent surfaces, and with said support cap, cutting bit and cutting bit shield each defining a coaxial opening extending therethrough, and wherein said connector means extends through said coaxial openings for mounting the assembly to an adzing apparatus.

11. The adzing bit assembly of claim 10 and wherein said support cap defines a hub projecting therefrom, said hub including a first large diameter portion sized and shaped to fit the opening of said cutting bit and a second smaller diameter portion sized and shaped to fit the opening of said cutting bit shield.

12. The improvement of claim 1 wherein said cutting bit first bearing surface is in flush contact with said cutting bit shield second bearing surface.

* * * * *